United States Patent
Kim et al.

(10) Patent No.: US 11,056,732 B2
(45) Date of Patent: Jul. 6, 2021

(54) BATTERY MANAGEMENT APPARATUS AND BATTERY PACK INCLUDING THE SAME

(71) Applicant: LG CHEM, LTD., Seoul (KR)

(72) Inventors: Ji-Eun Kim, Daejeon (KR); Sang-Hoon Lee, Daejeon (KR); Yean-Sik Choi, Daejeon (KR)

(73) Assignee: LG CHEM, LTD., Seoul (KR)

(*) Notice: Subject to any disclaimer, the term of this patent is extended or adjusted under 35 U.S.C. 154(b) by 279 days.

(21) Appl. No.: 16/348,427

(22) PCT Filed: Jul. 27, 2018

(86) PCT No.: PCT/KR2018/008570
§ 371 (c)(1),
(2) Date: May 8, 2019

(87) PCT Pub. No.: WO2019/027190
PCT Pub. Date: Feb. 7, 2019

(65) Prior Publication Data
US 2019/0273293 A1    Sep. 5, 2019

(30) Foreign Application Priority Data
Jul. 31, 2017 (KR) .......... 10-2017-0096810

(51) Int. Cl.
*H01M 10/613* (2014.01)
*H01M 10/42* (2006.01)
(Continued)

(52) U.S. Cl.
CPC ......... *H01M 10/613* (2015.04); *H01M 10/42* (2013.01); *H01M 10/44* (2013.01);
(Continued)

(58) Field of Classification Search
CPC .... H01M 10/613; H01M 10/42; H01M 10/44; H01M 10/48; H01M 10/63;
(Continued)

(56) References Cited

U.S. PATENT DOCUMENTS

2008/0054850 A1  3/2008  Tae et al.
2010/0019732 A1  1/2010  Utsumi et al.
(Continued)

FOREIGN PATENT DOCUMENTS

EP    2 797 336 A2    10/2014
JP    2008-62913 A    3/2008
(Continued)

OTHER PUBLICATIONS

English machine translation for KR-10-2015-0071758-A published Jun. 29, 2015.
(Continued)

*Primary Examiner* — Stacy Whitmore
(74) *Attorney, Agent, or Firm* — Birch, Stewart, Kolasch & Birch, LLP

(57) ABSTRACT

A battery management apparatus includes a master BMS and a plurality of slave BMSs connected to the master BMS by means of communication. The master BMS includes a master controller configured to generate operation order information of the plurality of slave BMSs based on state-of-charge information of each of a plurality of battery modules respectively connected to the plurality of slave BMSs. Each of the plurality of slave BMSs includes: a slave communicator configured to receive the operation order information generated by the master controller and receive battery temperature information measured by a temperature measurement sensor; and a slave controller configured to operate a battery cooler by using an output of a corresponding battery module according to a temperature value of the (Continued)

battery temperature information when the operation order corresponds to a first operation order according to the received operation order information or the slave communicator receives a first operation signal from another slave communicator.

10 Claims, 6 Drawing Sheets

(51) Int. Cl.
  H01M 10/44      (2006.01)
  H01M 10/48      (2006.01)
  H01M 10/63      (2014.01)
  H02J 7/00       (2006.01)
(52) U.S. Cl.
  CPC ......... *H01M 10/443* (2013.01); *H01M 10/48* (2013.01); *H01M 10/63* (2015.04); *H02J 7/0021* (2013.01); *H01M 10/425* (2013.01); *H01M 10/486* (2013.01); *H01M 2010/4271* (2013.01); *H01M 2220/20* (2013.01); *Y02E 60/10* (2013.01)
(58) Field of Classification Search
  CPC ........... H01M 10/443; H01M 2220/20; H01M 10/486; H01M 10/425; H01M 2010/4271; H02J 7/0021; Y02E 60/10
  See application file for complete search history.

(56) References Cited

U.S. PATENT DOCUMENTS

| | | | |
|---|---|---|---|
| 2011/0316486 A1* | 12/2011 | Inaba | H01M 10/48 320/150 |
| 2014/0099521 A1 | 4/2014 | Kim et al. | |
| 2014/0300364 A1 | 10/2014 | Choi | |
| 2014/0347013 A1 | 11/2014 | Kim | |
| 2014/0365792 A1 | 12/2014 | Yun | |
| 2015/0171491 A1 | 6/2015 | Lim | |
| 2017/0194673 A1 | 7/2017 | Jeon | |
| 2018/0012484 A1 | 1/2018 | Sakabe et al. | |
| 2019/0260097 A1 | 1/2019 | Kwon et al. | |
| 2019/0237816 A1 | 8/2019 | Kim et al. | |
| 2019/0252735 A1 | 8/2019 | Sung et al. | |
| 2019/0265304 A1 | 8/2019 | Kim et al. | |
| 2019/0356143 A1* | 11/2019 | Lee | G01R 31/3835 |
| 2020/0395627 A1* | 12/2020 | Kilburn | H02J 7/345 |

FOREIGN PATENT DOCUMENTS

| | | |
|---|---|---|
| JP | 2012-257436 A | 12/2012 |
| JP | 5304277 B2 | 10/2013 |
| JP | 2014-90664 A | 5/2014 |
| JP | 2014-239639 A | 12/2014 |
| JP | 2016-143113 A | 8/2016 |
| JP | 2019-538215 A | 12/2018 |
| JP | 2019-531042 A | 10/2019 |
| JP | 2020-501481 A | 1/2020 |
| JP | 2020-801482 A | 1/2020 |
| KR | 10-2014-0048359 A | 4/2014 |
| KR | 10-2014-0138067 A | 12/2014 |
| KR | 10-2015-0071432 A | 6/2015 |
| KR | 10-2015-0071758 A | 6/2015 |
| KR | 10-2016-0103403 A | 9/2016 |
| KR | 10-1670356 B1 | 10/2016 |
| KR | 10-2017-0052028 A | 5/2017 |
| KR | 10-2017-0081868 A | 7/2017 |
| WO | WO 2011/076478 A2 | 6/2011 |
| WO | WO 2015/040655 A1 | 3/2015 |

OTHER PUBLICATIONS

European Search for Patent Application No. 18842326.3 dated Feb. 6, 2020.

International Search Report for PCT/KR2018/008570 dated Nov. 26, 2018.

* cited by examiner

BATTERY MANAGEMENT APPARATUS AND BATTERY PACK INCLUDING THE SAME

TECHNICAL FIELD

The present disclosure relates to a battery management apparatus and a battery pack including the battery management apparatus, and more particularly, to a battery management apparatus, which may prevent degradation of a battery pack by maintaining a temperature of the battery pack within a normal temperature range based on state-of-charge information of a battery module, and a battery pack including the battery management apparatus.

The present application claims priority to Korean Patent Application No. 10-2017-0096810 filed on Jul. 31, 2017 in the Republic of Korea, the disclosures of which are incorporated herein by reference.

BACKGROUND ART

Secondary batteries, which are easy to apply to various product groups and have good electrical energy characteristics such as high energy density, are widely used for electric vehicles (EVs) or hybrid vehicles (HVs), driven by electric driving sources, as well as portable devices.

The secondary batteries are capable of repeatedly charging and discharging by electrochemical reactions, which may reduce the use of fossil fuels drastically, and also generate no by-products due to the use of energy. For this reason, the secondary batteries are attracting attention as a new environment-friendly energy source for improving energy efficiency.

Generally, an assembly includes a plurality of unit assembly secondary cells, and a battery pack applied to a vehicle or the like includes a plurality of the assemblies or battery modules. The cell includes a positive electrode current collector, a separator, an active material, an electrolyte, an aluminum thin film layer and the like and allows charging and discharging by an electrochemical reaction among the components.

The battery pack further includes a battery management system (BMS) for monitoring and controlling a state of a secondary battery by applying an algorithm for controlling a power supplied to a driving load such as a motor, measuring electric characteristic values such as current and voltage, controlling charge/discharge, controlling equalization and estimating a state of charge (SOC).

In addition, the battery pack includes a large number of secondary cells assembled into a multi-structure to configure a large-capacity system. In the secondary battery, charging or discharging is successively and repeatedly performed due to the internal electrochemical reactions. The charging/discharging process inevitably involves heat generation. In the structure in which the secondary battery has a large size, the heat generation due to charging and discharging rapidly increases.

The heating phenomenon may cause the performance deterioration by giving an inherent damage to the secondary battery that makes the electrochemical reactions. In addition, the heating phenomenon causes a secondary problem in that the life of the battery is not guaranteed, and it is known that the heating phenomenon can be a fatal weakness to safety such as explosion caused by heating.

Accordingly, a cooling device for monitoring the temperature of the battery pack and adjusting the temperature of the battery pack according to the monitoring result is operated for the batter pack so that the temperature of the battery pack is maintained within the normal temperature range.

However, in the case of the battery pack provided in a vehicle, if the vehicle is left for a long time in a parked state, the operation of the cooling device as well as the process of monitoring the temperature of the battery pack is stopped even though an external temperature varies, and thus the temperature of the battery pack may not be maintained within the normal temperature range.

Accordingly, if the vehicle having the battery pack is left for a long time in a parked state, the temperature of the battery pack is not managed so that the battery pack is exposed to the high or low temperature environment, thereby accelerating the degradation of the secondary battery included in the battery pack.

DISCLOSURE

Technical Problem

The present disclosure is directed to providing a battery management apparatus, which may effectively cool a battery pack while uniformly using the power of a battery module by operating a battery cooling unit based on state-of-charge information of a plurality of battery modules of the battery pack, and a battery pack including the battery management apparatus These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery management apparatus, which includes a master battery management system, (BMS) and a plurality of slave BMSs connected to the master BMS.

Preferably, the master BMS may include a master control unit configured to generate operation order information of the plurality of slave BMSs based on state-of-charge information of each of a plurality of battery modules respectively connected to the plurality of slave BMSs.

Preferably, each of the plurality of slave BMSs may include: a slave communicator configured to receive the operation order information generated by the master controller and receive battery temperature information measured by a temperature measurement sensor; and a slave controller configured to operate a battery cooler by using an output of a corresponding battery module according to a temperature value of the battery temperature information when an operation order corresponds to a first operation order according to the received operation order information or the slave communicator receives a first operation signal from another slave communicator.

Preferably, the master controller may generate the operation order information based on the state-of-charge information having a greater charge amount.

Preferably, when the temperature value of the battery temperature information is included in a preset temperature range, the slave controller may control the output of the corresponding battery module so that the output of the corresponding battery module is supplied to the battery cooler.

Preferably, when a charge amount of the state-of-charge information is equal to or smaller than a preset first charge amount, the slave controller may block at least one of the output of the corresponding battery module and communication between the slave communicator and the temperature measurement sensor.

Preferably, when a charge amount of the state-of-charge information is equal to or smaller than a preset first charge amount, the slave controller may control the slave communicator to send the first operation signal to a slave communicator of a slave BMS corresponding to a next operation order according to the operation order information.

Preferably, when a charge amount of the state-of-charge information is equal to or smaller than a preset first charge amount and the operation order corresponds to a final operation order according to the operation order information, the slave controller may control the slave communicator to send a second operation signal to the slave communicator of the slave BMS corresponding to the first operation order according to the operation order information.

Preferably, when the slave communicator receives the second operation signal and the charge amount of the state-of-charge information is equal to or smaller than a preset second charge amount that is smaller than the preset first charge amount, the slave controller may control the slave communicator to send a third operation signal to a slave communicator of a slave BMS corresponding to a next operation order according to the operation order information.

Preferably, when the slave communicator receives the second operation signal or the third operation signal and the temperature value of the battery temperature information is included in a preset temperature range, the slave controller may control the output of the corresponding battery module so that the output of the battery module is supplied to the battery cooler.

Preferably, when the slave communicator receives the second operation signal or the third operation signal and the charge amount of the state-of-charge information is equal to or smaller than the preset second charge amount, the slave controller may block at least one of the output of the corresponding battery module and communication between the slave communicator and the temperature measurement sensor.

A battery pack according to the present disclosure may include the battery management apparatus.

A vehicle according to the present disclosure may include the battery management apparatus.

Advantageous Effects

According to the present disclosure, operation order information is generated based on state-of-charge information of a plurality of battery modules, and a battery cooling unit is operated according to a temperature value of the battery temperature information until a charge amount of the battery modules is decreased to a preset charge amount or below in an operation order of the operation order information. Thus, it is possible to cool the battery pack by uniformly using the power of the battery modules.

BEST MODE

Figure 1:
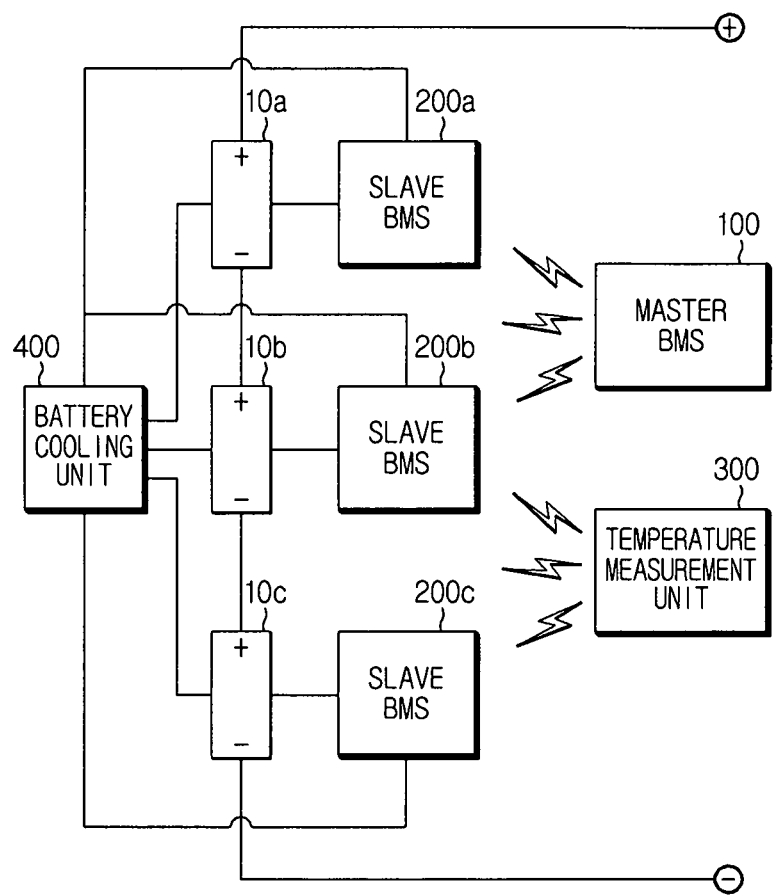
FIG. 1 is a diagram schematically showing the configuration of a battery management apparatus and a battery pack including the battery management apparatus according to an embodiment of the present disclosure.

The above objects, features and advantages will be described in detail below with reference to the accompanying drawings, so that those skilled in the art to which the present disclosure belongs can easily implement the technical idea of the present disclosure. In the explanations of the present disclosure, if it is deemed that any specific explanation of the related technology can unnecessarily obscure the gist of the present disclosure, the detailed explanation may be omitted. Hereinafter, a preferred embodiment according to the present disclosure will be described in detail with reference to the accompanying drawings. In the drawings, the same reference numerals are used to indicate the same or similar components.

Figure 2:
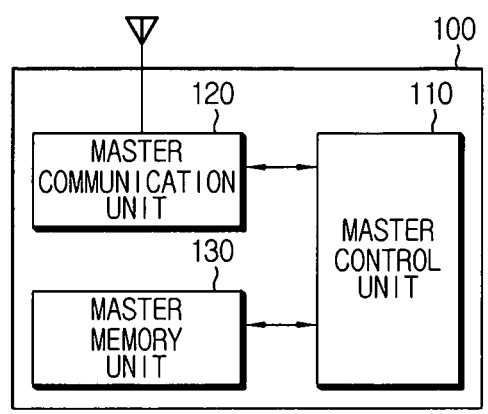
FIG. 2 is a diagram schematically showing the configuration of a master BMS of the battery management apparatus according to an embodiment of the present disclosure.
Figure 3:
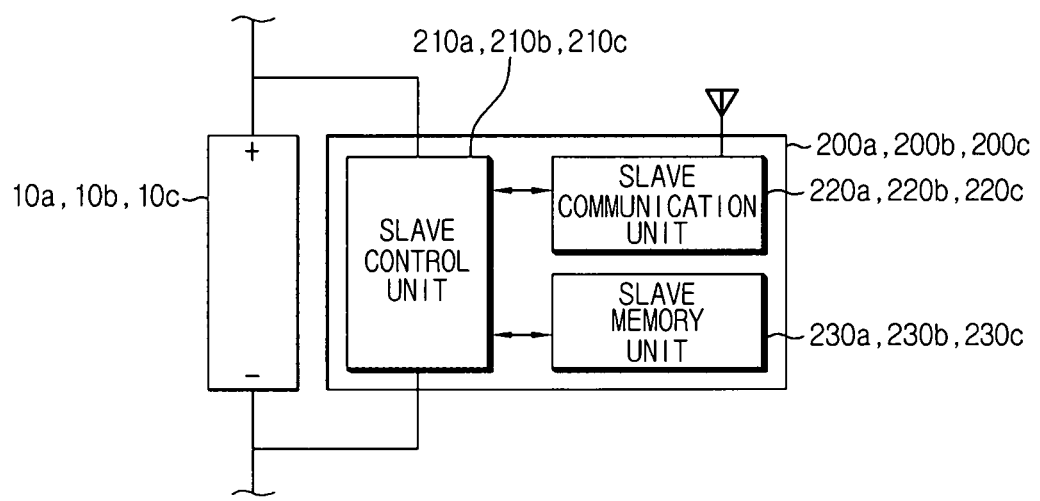
FIG. 3 is a diagram schematically showing the configuration of a slave BMS the battery management apparatus according to an embodiment of the present disclosure.

FIG. 1 is a diagram schematically showing the configuration of a battery management apparatus and a battery pack including the battery management apparatus according to an embodiment of the present disclosure, FIG. 2 is a diagram schematically showing the configuration of a master BMS of the battery management apparatus according to an embodiment of the present disclosure, and FIG. 3 is a diagram schematically showing the configuration of a slave BMS the battery management apparatus according to an embodiment of the present disclosure.

Referring to FIGS. 1 to 3, the battery management system may include a master BMS 100 and a plurality of slave BMSs 200a, 200b, 200c.

The master BMS 100 functions to integrally control the plurality of slave BMSs 200a, 200b, 200c, and may communicate with the plurality of slave BMSs 200a, 200b, 200c through a master communication unit 120, explained later, to request and receive information required for the integral control and send a signal containing a control command.

Meanwhile, the plurality of slave BMSs 200a, 200b, 200c may be connected to a plurality of battery modules 10a, 10b, 10c included in a battery pack to control charging and discharging of each of the plurality of battery modules 10a, 10b, 10c.

Hereinafter, for convenience in explanation, it will be assumed that the battery pack includes three battery modules 10a, 10b, 10c and the battery management system includes three slave BMSs 200a, 200b, 200c and one master BMS 100. However, the present disclosure is not limited thereto. For example, the battery pack may include only two battery modules or four or more battery modules. In addition, the battery management system may also include two slave BMSs or four or more slave BMSs corresponding to the number of battery modules included in the battery pack.

In addition, for convenience in explanation, the plurality of slave BMSs 200a, 200b, 200c may be called a first slave BMS 200a, a second slave BMS 200b and a third slave BMS 200c, respectively. Also, the plurality of battery modules 10a, 10b, 10c respectively connected to the first slave BMS 200a, the second slave BMS 200b and the third slave BMS 200c are called a first battery module 10a, a second battery module 10b and a third battery module 10c.

Hereinafter, the master BMS 100 and the plurality of slave BMSs 200a, 200b, 200c of the battery management apparatus according to an embodiment of the present disclosure will be described in detail.

The master BMS 100 may include a master control unit 110.

The master control unit 110 may generate operation order information between the plurality of slave BMSs 200a, 200b, 200c based on state-of-charge information of each of the plurality of battery modules 10a, 10b, 10c respectively connected to the plurality of slave BMSs 200a, 200b, 200c.

More specifically, the master control unit 110 may control the master communication unit 120 to send a state-of-charge information request signal to the plurality of slave BMSs 200a, 200b, 200c to request the state-of-charge information.

Here, the state-of-charge information may mean a power amount charged to each of the battery modules 10a, 10b, 10c. For example, the state-of-charge information may be a charge amount that expresses a charged power in comparison to the capacity of each battery module 10a, 10b, 10c as a percentage.

The plurality of slave BMSs 200a, 200b, 200c may respectively include slave communication units 220a, 220b, 220c and slave control units 210a, 210b, 210c.

The slave communication units 220a, 220b, 220c may receive operation order information generated by the master control unit 110 from the master communication unit 120 of the master BMS 100 and receive battery temperature information measured by a temperature measurement unit 300, explained later.

Here, the battery temperature information may mean an internal temperature of the battery pack that includes the battery management apparatus according to an embodiment of the present disclosure.

Meanwhile, the temperature measurement unit 300 may include a temperature measurement sensor located in the battery pack to measure a temperature. In addition, the temperature measurement unit 300 may further include a wireless communication module to send the measured temperature information to the slave communication units 220a, 220b, 220c.

The wireless communication module may send the measured temperature information to the slave communication units 220a, 220b, 220c at every preset communication time. In particular, the wireless communication module may send the measured temperature information to all of the slave communication units 220a, 220b, 220c of the plurality of slave BMSs 200a, 200b, 200c at every preset communication time. In other words, the wireless communication module may conduct one-to-multi communication with the slave communication units 220a, 220b, 220c.

For example, if the preset communication time is set as 10 minutes, the wireless communication module may send the temperature information to all of the slave communication units 220a, 220b, 220c of the first slave BMS 200a, the second slave BMS 200b and the third slave BMS 200c at every 10 minutes.

The wireless communication module may communicate with the slave communication units 220a, 220b, 220c through wireless communication using at least one of WLAN (Wireless LAN) (Wi-Fi), Bluetooth, RFID (Radio Frequency Identification), IrDA (infrared Data Association), UWB (Ultra Wideband) and ZigBee.

Preferably, the wireless communication module may communicate with the slave communication units 220a, 220b, 220c through wireless communication using Bluetooth 4.0. By doing so, the wireless communication module may minimize the power consumed for communication to keep long-time communication with the slave communication units 220a, 220b, 220c.

In addition, the slave communication units 220a, 220b, 220c may minimize the power of the battery modules 10a, 10b, 10c consumed for communication by communicating with the wireless communication module of the temperature measurement unit 300 through wireless communication using Bluetooth 4.0 as described above.

The temperature measurement unit 300 may be included in the battery management apparatus according to an embodiment of the present disclosure.

If the operation order corresponds to a first operation order according to the operation order information received to the slave communication units 220a, 220b, 220c or the slave communication units 220a, 220b, 220c receives a first operation signal from another slave communication unit, the slave control units 210a, 210b, 210c may operate a battery cooling unit 400 by using an output of a corresponding battery module 10a, 10b, 10c according to a temperature value of the battery temperature information.

Here, the battery cooling unit 400 may be a component located in or out of the battery pack including the battery management apparatus according to an embodiment of the present disclosure to cool the battery pack and the battery modules 10a, 10b, 10c. For example, the battery cooling unit 400 may be configured to include a pump for supplying a cooling water around the battery pack.

The slave control units 210a, 210b, 210c controls the slave communication units 220a, 220b, 220c at a specific case to perform communication for receiving the battery temperature information from the temperature measurement unit 300. In addition, in this case, the slave control units 210a, 210b, 210c may perform a cooling operation for operating the battery cooling unit 400 by using the output of a corresponding battery module 10a, 10b, 10c according to the temperature value of the battery temperature information.

Here, the specific case may be a first case where the operation order of the slave BMSs 200a, 200b, 200c including the slave control units 210a, 210b, 210c corresponds to the first operation order according to the operation order information, or a second case where the first operation signal is received from another slave communication unit included in another slave BMS.

The first case and the second case will be described later.

Hereinafter, the process that the master control unit 110 generates the operation order information will be described.

If the state-of-charge information is received as a response to the state-of-charge information request signal from the slave communication units 220a, 220b, 220c of the plurality of slave BMSs 200a, 200b, 200c, the master control unit 110 may generate the operation order information to have a faster operation order as the state-of-charge information has a greater charge amount.

In other words, the master control unit 110 may generate the operation order information so that a faster operation order is given to a battery module 10a, 10b, 10c whose state-of-charge information has a greater charge amount.

Figure 4:
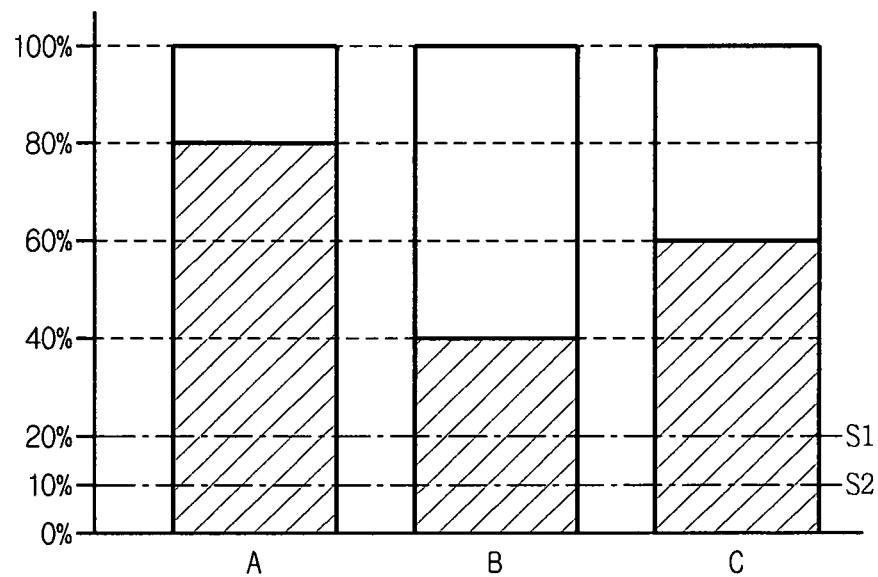
FIG. 4 is a diagram schematically showing an example of state-of-charge information used in the battery management apparatus according to an embodiment of the present disclosure.

FIG. 4 is a diagram schematically showing an example of state-of-charge information used in the battery management apparatus according to an embodiment of the present disclosure.

Referring to FIG. 4 further, the master control unit 110 may receive state-of-charge information A of the first battery module 10a whose charge amount is 80%, state-of-charge information B of the second battery module 10b whose charge amount is 40%, and state-of-charge information C of the third battery module 10c whose charge amount is 60%, through the master communication unit 120.

At this time, the master control unit 110 may generate the operation order information by determining that the operation order of the first slave BMS 200a, the operation order of the second slave BMS 200b and the operation order of the third slave BMS 200c as a first order, a third order and a second order, respectively, so that a faster order is given to the state-of-charge information having a greater charge amount.

After that, the master control unit 110 may control the master communication unit 120 to send the generated operation order information respectively to the slave communication units 220a, 220b, 220c of the plurality of slave BMSs 200a, 200b, 200c.

In other words, the master control unit 110 may be configured to generate the operation order information corresponding to the state-of-charge information of the battery modules 10a, 10b, 10c connected to the plurality of slave BMSs 200a, 200b, 200c and send the generated operation order information to the plurality of slave BMSs 200a, 200b, 200c again.

In particular, the battery management apparatus according to an embodiment of the present disclosure may be mounted to a vehicle to manage a battery pack of the vehicle.

At this time, if a park signal informing a parked state is output from an ECU (Electronic Control Unit) of the vehicle, the master control unit 110 may control the master communication unit 120 to send a state-of-charge information request signal requesting the state-of-charge information to the slave communication units 220a, 220b, 220c of the plurality of slave BMSs 200a, 200b, 200c.

In other words, if a park signal is output from the ECU in order to manage the battery pack of the vehicle in a parked state, the master control unit 110 may control the master communication unit 120 to send the state-of-charge information request signal requesting the state-of-charge information to the slave communication units 220a, 220b, 220c of the plurality of slave BMSs 200a, 200b, 200c, and generate operation order information corresponding to the received state-of-charge information.

Meanwhile, the master control unit 110 may include at least one processor and be operably connected to the master communication unit 120 and a master memory unit 130, explained later. By doing so, the master control unit 110 may be configured to manage overall operations of the master BMS.

In order to execute control logics, each processor included in the master control unit 110 may selectively include processors well known in the art, application-specific integrated circuits (ASICs), other chipsets, logic circuits, registers, communication modems, data processors, and the like.

Various control logics of the master control unit 110 may be combined, and the combined control logics may be created in the form of a computer-readable code system and recorded on a computer-readable recording medium.

Here, the type of the recording medium is not particularly limited as long as the recording medium is accessible by a processor. For example, the recording medium may include at least one selected from the group consisting of a ROM, a RAM, a register, a CD-ROM, a magnetic tape, a hard disk, a floppy disk, and an optical data recording device.

Here, the code system may be modulated into a carrier signal to be included in a communication carrier at a specific time point, and may be executed by a processor. In addition, functional programs, codes and code segments for implementing the combined control logics may be easily inferred by programmers skilled in the art to which the present application pertains.

Meanwhile, as shown in FIG. 2, the master BMS may further include the master communication unit 120 and the master memory unit 130 as described above.

The master communication unit 120 may communicate with the slave communication units 220a, 220b, 220c respectively included in the plurality of slave BMSs 200a, 200b, 200c and the ECU of the vehicle by using at least one of wired communication and wireless communication.

Here, the wired communication may use at least one of CAN (Controller Area Network), LIN (Local Interconnect Network) and FlexRay. In addition, wireless communication may use at least one of WLAN (Wireless LAN) (Wi-Fi), Bluetooth, RFID (Radio Frequency Identification), IrDA (infrared Data Association), UWB (Ultra Wideband) and ZigBee.

The master memory unit 130 may temporarily store the state-of-charge information of each of the plurality of battery modules 10a, 10b, 10c received to the master communication unit 120, and output the stored state-of-charge information to the master control unit 110 according to a request of the master control unit 110.

In addition, the master memory unit 130 may store the operation order information generated by the master control unit 110, and output the operation order information to the master communication unit 120 when the master communication unit 120 sends the operation order information to the slave communication units 220a, 220b, 220c of the slave BMS 200a, 200b, 200c.

Moreover, the master memory unit 130 may store program codes in which processes executable by the master control unit 110 are stored.

A known information storage means capable of recording, erasing, updating and reading data can be used as the master memory unit 130 without special limitation. For example, the master memory unit 130 may be DRAM, SDRAM, a flash memory, ROM, EEPROM, a register or the like.

Meanwhile, the master memory unit 130 may be physically separated from the master control unit 110 or be integrated on a chip or the like together with the master control unit 110.

Hereinafter, the first case and the second case mentioned above will be described in detail.

First, seeing the first case, if the operation order information is received to the slave communication units 220a, 220b, 220c, the slave control units 210a, 210b, 210c may check whether the operation order of the slave BMS 200a, 200b, 200c including the slave control units 210a, 210b, 210c corresponds to a first operation order according to the operation order information.

If the operation order of the slave BMS 200a, 200b, 200c including the slave control units 210a, 210b, 210c corresponds to the first operation order according to the operation order information as a result of the operation order checking, the slave control units 210a, 210b, 210c may operate the slave communication units 220a, 220b, 220c to receive the battery temperature information from the temperature measurement unit 300.

In addition, if the operation order of the slave BMS 200a, 200b, 200c including the slave control units 210a, 210b, 210c corresponds to the first operation order according to the operation order information as a result of the operation order checking, the slave control units 210a, 210b, 210c may operate the battery cooling unit 400 by using the output of a corresponding battery module 10a, 10b, 10c according to the temperature value of the battery temperature information.

Here, the corresponding battery module 10a, 10b, 10c may be each of the battery module 10a, 10b, 10c connected to each slave BMS 200a, 200b, 200c including the slave control units 210a, 210b, 210c.

In other words, if the operation order of the slave BMS 200a, 200b, 200c including the slave control units 210a, 210b, 210c is the first order, the slave control units 210a, 210b, 210c may operate the slave communication units 220a, 220b, 220c to receive the battery temperature information from the temperature measurement unit 300, and operate the battery cooling unit 400 by controlling the output of the corresponding battery module 10a, 10b, 10c according to the temperature value of the received battery temperature information.

At this time, if the temperature value of the battery temperature information is included in a preset temperature range, the slave control units 210a, 210b, 210c may control the output of the corresponding battery module 10a, 10b, 10c to supply the output of the corresponding battery module 10a, 10b, 10c to the battery cooling unit 400.

On the contrary, if the temperature value of the battery temperature information is not included in a preset temperature range, the slave control units 210a, 210b, 210c may block the output of the corresponding battery module 10a, 10b, 10c not to operate the battery cooling unit 400.

Here, the preset temperature range may be a temperature range of the battery pack in which the battery pack is deteriorated, heated or degraded.

In other words, if the operation order information is received, the slave control units 210a, 210b, 210c may check the operation order of the slave BMS 200a, 200b, 200c including the slave control units 210a, 210b, 210c. After that, if the operation order is the first order as a result of the operation order checking, the slave control units 210a, 210b, 210c may receive the battery temperature information through the slave communication units 220a, 220b, 220c and check whether the temperature value of the received battery temperature information is included in the preset temperature range. Finally, if the temperature value of the battery temperature information is included in the preset temperature range, the slave control units 210a, 210b, 210c may control the output of the corresponding battery module 10a, 10b, 10c to operate the battery cooling unit 400.

Meanwhile, if the operation order of the slave BMS 200a, 200b, 200c including the slave control units 210a, 210b, 210c does not correspond to the first operation order according to the operation order information as a result of the operation order checking, the slave control units 210a, 210b, 210c may block the communication between the slave communication units 220a, 220b, 220c and the temperature measurement unit 300.

In addition, if the operation order of the slave BMS 200a, 200b, 200c including the slave control units 210a, 210b, 210c does not correspond to the first operation order according to the operation order information as a result of the operation order checking, the slave control units 210a, 210b, 210c may block the output of the corresponding battery module 10a, 10b, 10c not to operate the battery cooling unit 400.

According to this configuration of the present disclosure, when the vehicle is parked, the temperature of the battery pack is monitored by preferentially using power of a battery module 10a, 10b, 10c having a greatest charge amount among the plurality of battery modules 10a, 10b, 10c of the battery pack provided at the vehicle, and the battery cooling unit 400 may be operated when the battery pack is overheated.

Meanwhile, if the charge amount of the state-of-charge information of the battery module 10a, 10b, 10c is equal to or smaller than a preset first charge amount S1, the slave control units 210a, 210b, 210c may block at least one of the output of the battery module 10a, 10b, 10c and the communication between the slave communication units 220a, 220b, 220c and the temperature measurement unit 300.

More specifically, if the operation order corresponds to the first operation order according to the operation order information, the slave control units 210a, 210b, 210c may control the slave communication units 220a, 220b, 220c to communicate with the temperature measurement unit 300, and operate the battery cooling unit 400 according to the temperature value of the battery temperature information.

By doing so, the power charged to the battery module 10a, 10b, 10c may be discharged due to the operation of the slave communication units 220a, 220b, 220c and the battery cooling unit 400.

Thus, if the charge amount of the state-of-charge information of the battery module 10a, 10b, 10c is equal to or smaller than the preset first charge amount S1, the slave control units 210a, 210b, 210c may prevent the power charged to the battery module 10a, 10b, 10c from lowering below a certain level by blocking at least one of the output of the battery module 10a, 10b, 10c and the communication between the slave communication units 220a, 220b, 220c and the temperature measurement unit 300.

Meanwhile, if the charge amount of the state-of-charge information of the battery module 10a, 10b, 10c is equal to or smaller than the preset first charge amount S1, the slave control units 210a, 210b, 210c may control the slave communication units 220a, 220b, 220c to send the first operation signal to a slave communication unit of a slave BMS corresponding to a next operation order according to the operation order information.

More specifically, after blocking the output of the battery module 10a, 10b, 10c and the communication between the slave communication units 220a, 220b, 220c and the temperature measurement unit 300, the slave control units 210a, 210b, 210c may control the slave communication units 220a, 220b, 220c to send the first operation signal so that the slave control unit of the slave BMS corresponding to the next operation order according to the operation order information monitors the battery temperature information and operates the battery cooling unit 400.

In other words, the slave control units 210a, 210b, 210c may be configured to perform the communicating operation and the cooling operation as described above if the operation order corresponds the first operation order according to the operation order information, and to stop the communicating operation and the cooling operation and send the first operation signal to the slave control unit of the slave BMS corresponding to the next operation order if the charge amount of the battery module 10a, 10b, 10c is discharged to the preset first charge amount S1 or below due to the communicating operation and the cooling operation.

According to this configuration of the present disclosure, the slave control units 210a, 210b, 210c of the plurality of slave BMSs 200a, 200b, 200c may monitor the battery temperature information according to the operation order of the operation order information and operate the battery cooling unit 400 until the charge amount of the state-of-charge information of the battery module 10a, 10b, 10c is lowered to the preset first charge amount S1 or below.

Hereinafter, the first case will be described based on an example.

As described above with reference to FIG. 4, if the charge amounts of the state-of-charge information A of the first battery module 10a, the state-of-charge information B of the second battery module 10b and the state-of-charge information C of the third battery module 10c are respectively 80%, 40% and 60%, the first order, the second order and the third order of the operation order information may be the first slave BMS 200a, the third slave BMS 200c and the second slave BMS 200b, respectively.

Accordingly, the slave control unit 210a of the first slave BMS 200a may check that the operation order of the first slave BMS 200a is the first order according to the operation order information, and operate the slave communication unit 220a to receive the battery temperature information from the temperature measurement unit 300.

After that, the slave control unit 210a of the first slave BMS 200a may control the output of the first battery module 10a to operate the battery cooling unit 400 if the temperature value of the battery temperature information is included in the preset temperature range.

Figure 5:
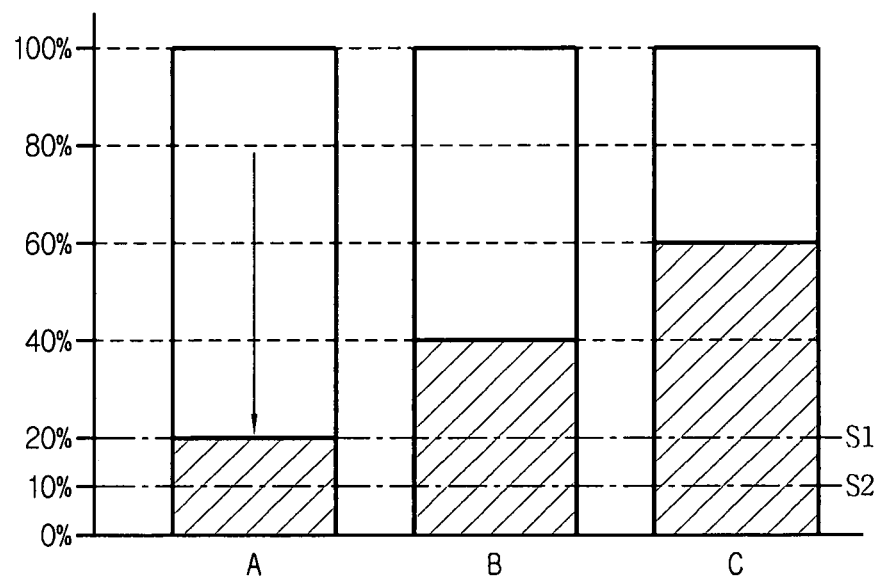
FIG. 5 is a diagram schematically showing an example of the state-of-charge information where a first battery module is discharged in FIG. 4.

FIG. 5 is a diagram schematically showing an example of the state-of-charge information where a first battery module is discharged in FIG. 4.

Referring to FIG. 5 further, the slave control unit 210a of the first slave BMS 200a may operate the slave communication unit 220a to receive the battery temperature information from the temperature measurement unit 300 and controls the output of the first battery module 10a to operate the battery cooling unit 400, so that the charge amount of the state-of-charge information A of the first battery module 10a is lowered to 20% or less of the preset first charge amount S1.

At this time, the slave control unit 210a of the first slave BMS 200a monitors the state-of-charge information, and if the charge amount of the state-of-charge information A is 20% or less of the preset first charge amount S1 due to the operation of the slave communication unit 220a and the battery cooling unit 400, at least one of the output of the first battery module 10a and the communication between the slave communication unit 220a and the temperature measurement unit 300 may be blocked.

In other words, if the charge amount of the state-of-charge information A of the first battery module 10a is 20% or less of the preset first charge amount S1, the slave control unit 210a of the first slave BMS 200a may block the output of the first battery module 10a to prevent the first battery module 10a from being continuously discharged.

Meanwhile, if the charge amount of the state-of-charge information A of the first battery module 10a is lowered to 20% or less of the preset first charge amount S1, the slave control unit 210a of the first slave BMS 200a may control the slave communication unit 220a to send the first operation signal to the slave communication unit 220c of the third slave BMS 200c that corresponds to the second order according to the operation order information.

By doing so, the slave control unit 210c of the third slave BMS 200c may keep monitoring the battery temperature information and operating the battery cooling unit 400, subsequent to the slave control unit 210a of the first slave BMS 200a.

Hereinafter, the second case will be described in detail.

As described above, if the slave communication units 220a, 220b, 220c receive the first operation signal, the slave control units 210a, 210b, 210c may control so that the slave communication units 220a, 220b, 220c and the temperature measurement unit 300 communicate to receive the battery temperature information, and operate the battery cooling unit 400 by controlling the output of the corresponding battery module 10a, 10b, 10c according to the temperature value of the received battery temperature information.

At this time, if the temperature value of the battery temperature information is included in the preset temperature range, the slave control units 210a, 210b, 210c may control the output of the corresponding battery module 10a, 10b, 10c so that the output of the corresponding battery module 10a, 10b, 10c is supplied to the battery cooling unit 400.

On the contrary, if the temperature value of the battery temperature information is not included in the preset temperature range, the slave control units 210a, 210b, 210c may block the output of the corresponding battery module 10a, 10b, 10c not to operate the battery cooling unit 400.

After that, if the charge amount of the state-of-charge information of the battery module 10a, 10b, 10c is equal to or smaller than the preset first charge amount S1, the slave control units 210a, 210b, 210c may block at least one of the output of the battery module 10a, 10b, 10c and the communication between the slave communication units 220a, 220b, 220c and the temperature measurement unit 300.

In addition, if the charge amount of the state-of-charge information of the battery module 10a, 10b, 10c is equal to or smaller than the preset first charge amount S1, the slave control units 210a, 210b, 210c may control the slave communication units 220a, 220b, 220c to send the first operation signal to the slave communication unit of the slave BMS corresponding to the next operation order according to the operation order information.

In the second case, if the operation order corresponds to the operation order according to the operation order information even though it is operated at a different sequence compared to the slave control units 210a, 210b, 210c at the first case, the slave control units 210a, 210b, 210c may perform the communicating operation and the cooling operation identically.

However, if the charge amount of the state-of-charge information of the battery module 10a, 10b, 10c is equal to or smaller than the preset first charge amount S1 and the operation order corresponds to a final operation order according to the operation order information, the slave control units 210a, 210b, 210c at the second case may control the slave communication units 220a, 220b, 220c to send a second operation signal to the slave communication unit of the slave BMS corresponding to the first operation order according to the operation order information.

More specifically, if the charge amount of the state-of-charge information of the battery module 10a, 10b, 10c is equal to or smaller than the preset first charge amount S1, the slave control units 210a, 210b, 210c may check whether the operation order of the slave BMS 200a, 200b, 200c including the slave control units 210a, 210b, 210c is a final operation order, namely a final operation order of the operation order information.

If the operation order corresponds to the final operation order of the operation order information as a result of the operation order checking, the slave control units 210a, 210b, 210c may control the slave communication units 220a, 220b, 220c to send the second operation signal, instead of the first operation signal.

At this time, the slave control units 210a, 210b, 210c may control the slave communication units 220a, 220b, 220c to send the second operation signal to the slave communication unit of the slave BMS corresponding to the first operation order according to the operation order information.

In other words, if the charge amount of the battery module 10a, 10b, 10c is equal to or smaller than the preset first charge amount S1 and the operation order corresponds to the final operation order, the slave control units 210a, 210b, 210c may send the corresponding second operation signal to the slave communication unit of the slave BMS 200a, 200b, 200c corresponding to the first operation order.

According to this configuration of the present disclosure, the communicating operation and the cooling operation may be performed by using the plurality of battery modules 10a, 10b, 10c included in the battery pack from a battery module having a greater charge amount to the preset first charge amount S1.

Hereinafter, the second case will be described based on an example.

As described above with reference to FIG. 5, if the state-of-charge information A of the first battery module 10a is 20% or less of the preset first charge amount S1, the slave control unit 210a of the first slave BMS 200a may control the slave communication unit 220a to send the first operation signal to the slave communication unit 220c of the third slave BMS 200c whose operation order corresponds to the second order.

After that, if the slave communication unit 220c of the third slave BMS 200c receives the first operation signal, the slave control unit 210c of the third slave BMS 200c may operate the slave communication unit 220c to receive the battery temperature information from the temperature measurement unit 300 in order to monitor the battery temperature information.

After that, if the temperature value of the battery temperature information is included in the preset temperature range, the slave control unit 210c of the third slave BMS 200c may operate the battery cooling unit 400 by controlling the output of the third battery module 10c.

Figure 6:
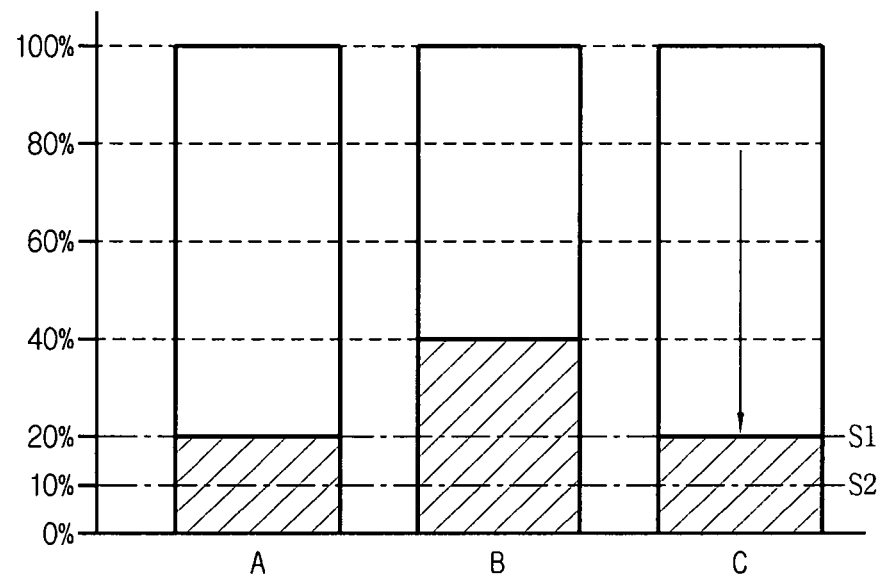
FIG. 6 is a diagram schematically showing an example of the state-of-charge information where a third battery module is discharged in FIG. 5.

FIG. 6 is a diagram schematically showing an example of the state-of-charge information where a third battery module is discharged in FIG. 5.

Referring to FIG. 6 further, the slave control unit 210c of the third slave BMS 200c may operate the slave communication unit 220c to receive the battery temperature information from the temperature measurement unit 300 and operates the battery cooling unit 400 by controlling the output of the third battery module 10c, so that the charge amount of the state-of-charge information C of the third battery module 10c is lowered to 20% or less of the preset first charge amount S1.

Accordingly, if the charge amount of the state-of-charge information C of the third battery module 10c is 20% or less of the preset first charge amount S1, the slave control unit 210c of the third slave BMS 200c may block at least one of the output of the third battery module 10c and the communication between the slave communication unit 220c and the temperature measurement unit 300.

In addition, if the charge amount of the state-of-charge information C of the third battery module 10c is 20% or less of the preset first charge amount S1, the slave control unit 210c of the third slave BMS 200c may control the slave communication unit 220c to send the first operation signal to the slave communication unit 220b of the second slave BMS 200b corresponding to the third order according to the operation order information.

By doing so, it is possible to keep monitoring the battery temperature information and operating the battery cooling unit 400, subsequent to the slave control unit 210b of the second slave BMS 200b and the slave control unit 210c of the third slave BMS 200c.

Figure 7:
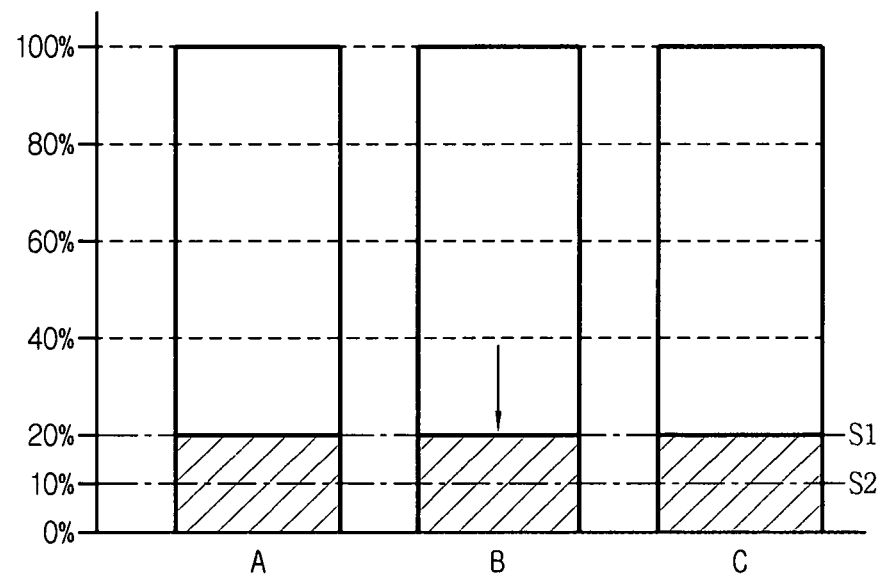
FIG. 7 is a diagram schematically showing an example of the state-of-charge information where a second battery module is discharged in FIG. 6.

FIG. 7 is a diagram schematically showing an example of the state-of-charge information where a second battery module is discharged in FIG. 6.

Referring to FIG. 7 further, if the slave communication units 220b of the second slave BMS 200b receives the first operation signal, the slave control unit 210b of the second slave BMS 200b may keep monitoring the battery temperature information and operating the battery cooling unit 400 by using the output of the second battery module 10b until the state-of-charge information B of the second battery module 10b is lowered to 20% or less of the preset first charge amount S1, similar to the slave control unit 210c of the third slave BMS 200c.

If the state-of-charge information B of the second battery module 10b is lowered to 20% or less of the preset first charge amount S1 and the operation order is checked as corresponding to a final order, namely the third order according to the operation order information, the slave control unit 210b of the second slave BMS 200b may control the slave communication unit 220b to send the second operation signal to the slave communication unit 220a of the first slave BMS 200a corresponding to the first order according to the operation order information.

Meanwhile, if the slave communication units 220a, 220b, 220c receives the second operation signal or a third operation signal from another slave communication unit, the slave control units 210a, 210b, 210c may operate the battery cooling unit 400 by using the output of the corresponding battery module 10a, 10b, 10c according to the temperature value of the battery temperature information.

More specifically, in a third case where the second operation signal is received from another slave communication unit and a fourth case where the third operation signal is received, the slave control units 210a, 210b, 210c may perform the communicating operation to receive the battery temperature information from the temperature measurement unit 300 by operating the slave communication units 220a, 220b, 220c and the cooling operation to operate the battery cooling unit 400 by using the output of the corresponding battery module 10a, 10b, 10c according to the temperature value of the battery temperature information.

In other words, the slave control units 210a, 210b, 210c in the third case and the fourth case are different from the slave control units 210a, 210b, 210c in the first case and the second case just in the point that the operation is performed according to the operation order information, and when corresponding to the same operation order, the communicating operation and the cooling operation may be performed identically.

Accordingly, the repeated explanation will be omitted in the followings, and only different features in the third case and the fourth case will be described.

As described above, if the slave communication units 220a, 220b, 220c receive the second operation signal, the slave control units 210a, 210b, 210c in the third case may perform the communicating operation and the cooling operation.

After that, if the charge amount of the state-of-charge information of the battery module 10a, 10b, 10c is equal to or smaller than the preset second charge amount S2 due to the communicating operation and the cooling operation, the slave control units 210a, 210b, 210c may stop at least one of the communicating operation and the cooling operation.

Here, the preset second charge amount S2 is may be a minimum charge amount that is smaller than the preset first charge amount S1 and should be maintained to prevent degradation and life reduction.

In other words, if the charge amount of the state-of-charge information of the battery module 10a, 10b, 10c is equal to or smaller than the preset second charge amount S2 due to the communicating operation and the cooling operation, the slave control units 210a, 210b, 210c may block the communication between the slave communication units 220a, 220b, 220c and the temperature measurement unit 300 and blocks the power of the battery module 10a, 10b, 10c to intercept the operation of the battery cooling unit 400 so that the battery module 10a, 10b, 10c is prevented from being discharged further.

Meanwhile, if the charge amount of the state-of-charge information of the battery module 10a, 10b, 10c is equal to or smaller than the preset second charge amount S2, the slave control units 210a, 210b, 210c may control the slave communication units 220a, 220b, 220c to send the third operation signal to the slave communication unit of the slave BMS corresponding to the next operation order according to the operation order information.

Hereinafter, the third case will be described based on an example.

As described above with reference to FIG. 7, if the state-of-charge information C of the second battery module 10b is lowered to 20% or less of the preset first charge amount S1, the slave control unit 210b of the second slave BMS 200b may control the slave communication unit 220b to send the second operation signal to the slave communication unit 220a of the first slave BMS 200a corresponding to the first order of the operation order information.

Accordingly, if the second operation signal is received to the slave communication unit 220a, the slave control unit 210a of the first slave BMS 200a may operate the slave communication unit 220a to receive the battery temperature information from the temperature measurement unit 300.

After that, if the temperature value of the battery temperature information is included in the preset temperature range, the slave control unit 210a of the first slave BMS 200a may control the output of the first battery module 10a to operate the battery cooling unit 400.

Figure 8:
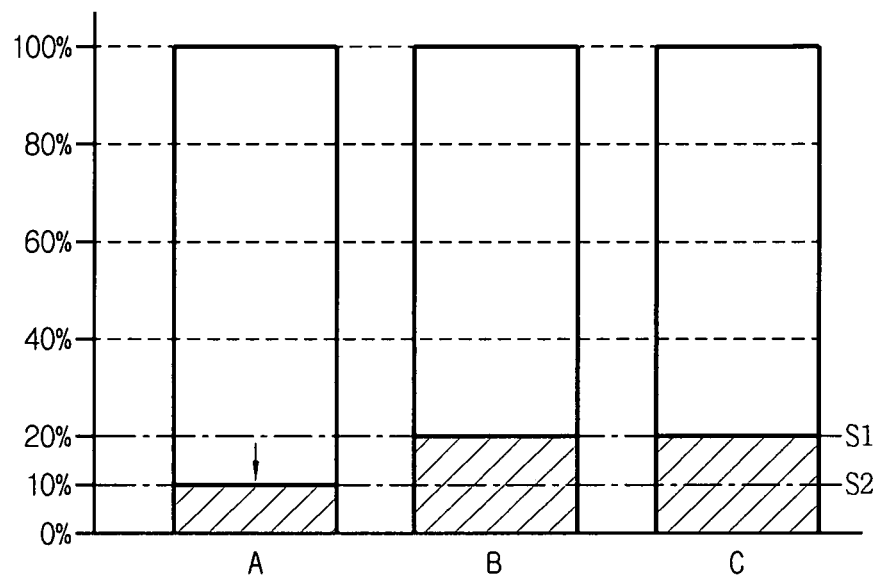
FIG. 8 is a diagram schematically showing an example of the state-of-charge information where the first battery module is discharged in FIG. 7.

FIG. 8 is a diagram schematically showing an example of the state-of-charge information where the first battery module is discharged in FIG. 7.

Referring to FIG. 8 further, the slave control unit 210a of the first slave BMS 200a may operate the slave communication unit 220a to receive the battery temperature information from the temperature measurement unit 300 and controls the output of the first battery module 10a to operate the battery cooling unit 400, so that the charge amount of the state-of-charge information A of the first battery module 10a is lowered to 10% or less of the preset second charge amount S2.

At this time, the slave control unit 210a of the first slave BMS 200a monitors the state-of-charge information, and if the charge amount of the state-of-charge information A of the first battery module 10a is 10% or less of the preset second charge amount S2 due to the operation of the slave communication unit 220a and the battery cooling unit 400, the slave control unit 210a of the first slave BMS 200a may block at least one of the output of the first battery module 10a and the communication between the slave communication unit 220a and the temperature measurement unit 300.

In other words, if the charge amount of the state-of-charge information A of the first battery module 10a is lowered to 10% or less of the preset second charge amount S2 due to the communicating operation and the cooling operation, the slave control unit 210a of the first slave BMS 200a may block the communicating operation and the cooling operation to prevent the first battery module 10a from being discharged continuously.

Meanwhile, if the charge amount of the state-of-charge information A of the first battery module 10a is 10% or less of the preset second charge amount S2, the slave control unit 210a of the first slave BMS 200a may control the slave communication unit 220a to send the third operation signal to the slave communication unit 220c of the third slave BMS 200c corresponding to the second order according to the operation order information.

By doing so, the slave control unit 210c of the third slave BMS 200c may keep monitoring the battery temperature information and operating the battery cooling unit 400, subsequent to the slave control unit 210a of the first slave BMS 200a.

Hereinafter, the fourth case will be described.

As described above, if the slave communication units 220a, 220b, 220c receives the third operation signal, the slave control units 210a, 210b, 210c may perform the communicating operation and the cooling operation.

After that, if the charge amount of the state-of-charge information of the battery module 10a, 10b, 10c is equal to or smaller than the preset second charge amount S2 due to the communicating operation and the cooling operation, the slave control units 210a, 210b, 210c may stop at least one of the communicating operation and the cooling operation.

In other words, if the charge amount of the state-of-charge information of the battery module 10a, 10b, 10c is equal to or smaller than the preset second charge amount S2 due to the communicating operation and the cooling operation, the slave control units 210a, 210b, 210c may block the communication between the slave communication units 220a, 220b, 220c and the temperature measurement unit 300 and blocks the power of the battery module 10a, 10b, 10c to intercept the operation of the battery cooling unit 400 so that the battery module 10a, 10b, 10c is prevented from being discharged further.

According to this configuration of the present disclosure, if the charge amount charged to all battery modules 10a, 10b, 10c of the battery pack is reduced to the preset first charge amount S1 or below, the communicating operation and the cooling operation may be performed again in the operation order according to the operation order information so that the power of the battery module 10a, 10b, 10c discharged to cool the battery may be reduced step by step.

Hereinafter, the fourth case will be described based on an example.

As described above with reference to FIG. 8, if the state-of-charge information A of the first battery module 10a is 10% or less of the preset second charge amount S2, the slave control unit 210a of the first slave BMS 200a may control the slave communication unit 220c to send the third operation signal to the slave communication unit 220c of the third slave BMS 200c whose operation order corresponds to the second order.

After that, if the slave communication unit 220c of the third slave BMS 200c receives the third operation signal, the slave control unit 210c of the third slave BMS 200c may operate the slave communication unit 220c to receive the battery temperature information of the temperature measurement unit 300 in order to monitor the battery temperature information.

After that, if the temperature value of the battery temperature information is included in the preset temperature range, the slave control unit 210c of the third slave BMS 200c may control the output of the third battery module 10c to operate the battery cooling unit 400.

Figure 9:
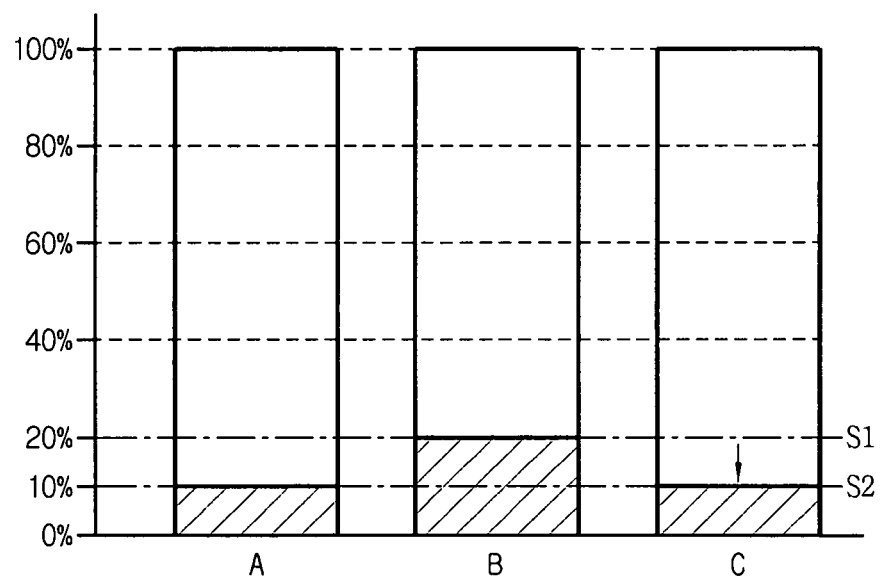
FIG. 9 is a diagram schematically showing an example of the state-of-charge information where the third battery module is discharged in FIG. 8.

FIG. 9 is a diagram schematically showing an example of the state-of-charge information where the third battery module is discharged in FIG. 8.

Referring to FIG. 9 further, the slave control unit 210c of the third slave BMS 200c may operate the slave communication unit 220c to receive the battery temperature information from the temperature measurement unit 300 and control the output of the third battery module 10c to operate the battery cooling unit 400, so that the charge amount of the state-of-charge information C of the third battery module 10c is lowered to 10% or less of the preset second charge amount S2.

Accordingly, if the charge amount of the state-of-charge information C of the third battery module 10c is 10% or less of the preset second charge amount S2, the slave control unit 210c of the third slave BMS 200c may block at least one of the output of the third battery module 10c and the communication between the slave communication unit 220c and the temperature measurement unit 300.

In addition, if the charge amount of the state-of-charge information C of the third battery module 10c is 10% or less of the preset second charge amount S2, the slave control unit 210c of the third slave BMS 200c may control the slave communication units 220a, 220b, 220c to send the third operation signal to the slave communication unit 220b of the second slave BMS 200b corresponding to the third order according to the operation order information.

By doing so, the slave control unit 210b of the second slave BMS 200b may keep the communicating operation and the cooling operation, subsequent to the slave control unit 210c of the third slave BMS 200c.

Figure 10:
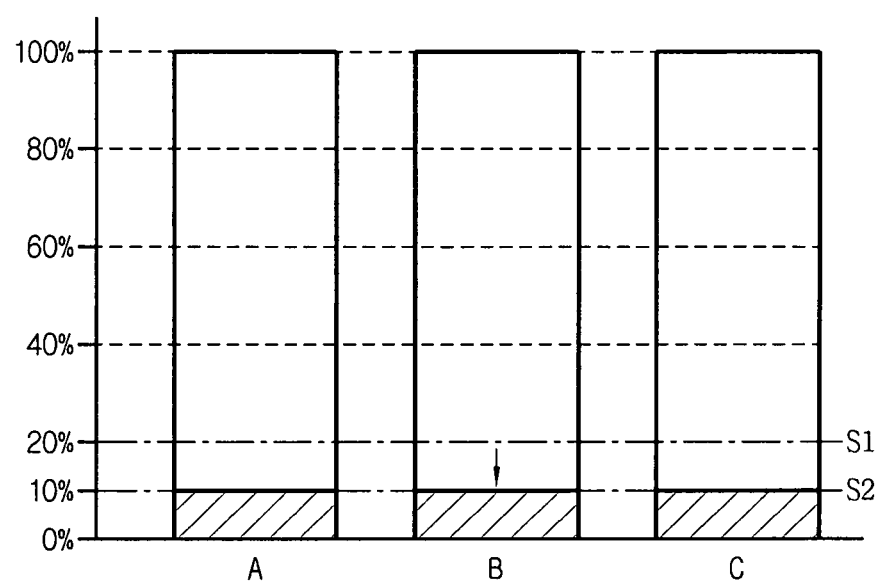
FIG. 10 is a diagram schematically showing an example of the state-of-charge information where the second battery module is discharged in FIG. 9.

FIG. 10 is a diagram schematically showing an example of the state-of-charge information where the second battery module is discharged in FIG. 9.

Referring to FIG. 10 further, if the slave communication unit 220b receives the third operation signal, the slave control unit 210b of the second slave BMS 200b may continuously perform the communicating operation and the cooling operation until the state-of-charge information B of the second battery module 10b is lowered to 10% or less of the preset second charge amount S2, similar to the slave control unit 210c of the third slave BMS 200c.

According to this configuration of the present disclosure, the battery management apparatus may determine an operation order of the battery modules 10a, 10b, 10c from a battery module having a greater charge amount at initially performing the battery management operation, and perform the communicating operation and the cooling operation in the determined operation order until a charge amount of each battery module 10a, 10b, 10c is lowered to the preset first charge amount S1 or below.

After that, if the charge amount of every battery module 10a, 10b, 10c is lowered to the preset first charge amount S1 or below, the battery management apparatus may perform the communicating operation and the cooling operation again in the determined operation order so that the charge amount of the battery module 10a, 10b, 10c is discharged to the preset second charge amount S2.

Accordingly, while the battery pack including the plurality of battery modules 10a, 10b, 10c is cooled, it is possible to prevent that only one battery module 10a, 10b, 10c is discharged, and the cooling operation may be performed by equally using the power of each battery module 10a, 10b, 10c.

Meanwhile, the slave control units 210a, 210b, 210c may include at least one processor and be operably connected to the slave communication units 220a, 220b, 220c and slave memory units 230a, 230b, 230c, explained below. By doing so, the slave control units 210a, 210b, 210c may be configured to manage overall operations of the slave BMSs 200a, 200b, 200c.

The slave control units 210a, 210b, 210c may include a sensing unit configured to detect a state of the battery modules 10a, 10b, 10c. For example, the sensing unit may include a voltage measurement circuit for detecting voltage of the battery modules 10a, 10b, 10c, a current measurement circuit for detecting current of the battery modules 10a, 10b, 10c, or a temperature detection circuit for detecting temperature of the battery modules 10a, 10b, 10c.

The slave control units 210a, 210b, 210c provides the sensing information exhibiting the detected state of the battery modules 10a, 10b, 10c to the slave communication units 220a, 220b, 220c. Accordingly, the slave communication units 220a, 220b, 220c may send the sensing information to the master communication unit 120 of the master BMS by means of wireless communication or wired communication.

Each processor provided at the slave control units 210a, 210b, 210c may selectively include processors well known in the art, application-specific integrated circuits (ASICs), other chipsets, logic circuits, registers, communication modems, data processors, and the like.

Various control logics of the slave control units 210a, 210b, 210c may be combined, and the combined control logics may be created in the form of a computer-readable code system and recorded on a computer-readable recording medium.

Here, the type of the recording medium is not particularly limited as long as the recording medium is accessible by a processor. For example, the recording medium may include at least one selected from the group consisting of a ROM, a RAM, a register, a CD-ROM, a magnetic tape, a hard disk, a floppy disk, and an optical data recording device.

Here, the code system may be modulated into a carrier signal to be included in a communication carrier at a specific time point, and may be executed by a processor. In addition, functional programs, codes and code segments for implementing the combined control logics may be easily inferred by programmers skilled in the art to which the present application pertains.

Meanwhile, as shown in FIG. 3, the slave BMS 200a, 200b, 200c may further include the slave communication units 220a, 220b, 220c and the slave memory unit 230a, 230b, 230c as described above.

The slave communication units 220a, 220b, 220c may communicate with the master communication unit 120 included in the master BMS and other slave communication units included in the plurality of slave BMSs 200a, 200b, 200c by means of wireless communication.

Here, the wireless communication may use at least one of WLAN (Wireless LAN) (Wi-Fi), Bluetooth, RFID (Radio Frequency Identification), IrDA (infrared Data Association), UWB (Ultra Wideband) and ZigBee.

The slave memory unit 230a, 230b, 230c may temporarily store the operation order information received from the master communication unit 120 and output the stored operation order information according to a request of the slave control units 210a, 210b, 210c.

In addition, the slave memory unit 230a, 230b, 230c may store program codes in which processes executable by the slave control units 210a, 210b, 210c are defined.

A known information storage means capable of recording, erasing, updating and reading data can be used as the slave memory unit 230a, 230b, 230c without special limitation. For example, the slave memory unit 230a, 230b, 230c may be DRAM, SDRAM, a flash memory, ROM, EEPROM, a register or the like.

Meanwhile, the slave memory unit 230a, 230b, 230c may be physically separated from the slave control units 210a, 210b, 210c or be integrated on a chip or the like together with the slave control units 210a, 210b, 210c.

Meanwhile, the battery pack according to the present disclosure includes at least one battery module described above. At this time, in addition to the battery module, the battery pack may further include a case for accommodating the battery module, a cartridge, a bus bar and the like. In particular, the battery pack according to an embodiment of the present disclosure may further include the battery management apparatus described above to cool the battery pack by uniformly using the power of each battery module.

The battery management apparatus according to the present disclosure may be applied to a vehicle such as an electric vehicle or a hybrid vehicle. In other words, the vehicle according to the present disclosure may include the battery management apparatus according to the present disclosure.

The present disclosure can be substituted, modified or changed in various ways without departing from the scope of the present disclosure by those skilled in the art and thus is not limited to the above embodiments and the accompanying drawings.

What is claimed is:

1. A battery management apparatus, comprising:
a master battery management system (BMS) and a plurality of slave BMSs connected to the master BMS,
wherein the master BMS includes a master controller configured to generate operation order information of the plurality of slave BMSs based on state-of-charge information of each of a plurality of battery modules respectively connected to the plurality of slave BMSs,
wherein each of the plurality of slave BMSs includes:
a slave communicator configured to receive the operation order information generated by the master controller and receive battery temperature information measured by a temperature measurement sensor; and
a slave controller configured to operate a battery cooler by using an output of a corresponding battery module according to a temperature value of the battery temperature information when an operation order corresponds to a first operation order according to the received operation order information or the slave communicator receives a first operation signal from another slave communicator.

2. The battery management apparatus according to claim 1, wherein the master controller generates the operation order information based on the state-of-charge information having a greater charge amount.

3. The battery management apparatus according to claim 1, wherein when the temperature value of the battery temperature information is included in a preset temperature range, the slave controller controls the output of the corresponding battery module so that the output of the corresponding battery module is supplied to the battery cooler.

4. The battery management apparatus according to claim 1, wherein when a charge amount of the state-of-charge information is equal to or smaller than a preset first charge amount, the slave controller blocks at least one of the output of the corresponding battery module and communication between the slave communicator and the temperature measurement sensor.

5. The battery management apparatus according to claim 1, wherein when a charge amount of the state-of-charge information is equal to or smaller than a preset first charge amount, the slave controller controls the slave communicator to send the first operation signal to a slave communicator of a slave BMS corresponding to a next operation order according to the operation order information.

6. The battery management apparatus according to claim 1, wherein when a charge amount of the state-of-charge information is equal to or smaller than a preset first charge amount and the operation order corresponds to a final operation order according to the operation order information, the slave controller controls the slave communicator to send a second operation signal to the slave communicator of the slave BMS corresponding to the first operation order according to the operation order information.

7. The battery management apparatus according to claim 6, wherein when the slave communicator receives the second operation signal and the charge amount of the state-of-charge information is equal to or smaller than a preset second charge amount that is smaller than the preset first charge amount, the slave controller controls the slave communicator to send a third operation signal to a slave communicator of a slave BMS corresponding to a next operation order according to the operation order information.

8. The battery management apparatus according to claim 7, wherein when the slave communicator receives the second operation signal or the third operation signal and the temperature value of the battery temperature information is included in a preset temperature range, the slave controller controls the output of the corresponding battery module so that the output of the battery module is supplied to the battery cooler.

9. The battery management apparatus according to claim 7,
wherein when the slave communicator receives the second operation signal or the third operation signal and the charge amount of the state-of-charge information is equal to or smaller than the preset second charge amount, the slave controller blocks at least one of the output of the corresponding battery module and the communication between the slave communicator and the temperature measurement sensor.

10. A battery pack, comprising a battery management apparatus defined in claim 1.

* * * * *